United States Patent
Amado

(10) Patent No.: US 9,616,857 B1
(45) Date of Patent: Apr. 11, 2017

(54) OVERHEAD SNOW MOVING DEVICE

(71) Applicant: Rafael Amado, Elizabeth, NJ (US)

(72) Inventor: Rafael Amado, Elizabeth, NJ (US)

(*) Notice: Subject to any disclaimer, the term of this patent is extended or adjusted under 35 U.S.C. 154(b) by 0 days.

(21) Appl. No.: 14/932,625

(22) Filed: Nov. 4, 2015

(51) Int. Cl.
  *E04D 13/10* (2006.01)
  *B60S 3/04* (2006.01)
  *B25G 1/04* (2006.01)
  *E01H 5/02* (2006.01)

(52) U.S. Cl.
  CPC ............... *B60S 3/045* (2013.01); *B25G 1/04* (2013.01); *E04D 13/106* (2013.01)

(58) Field of Classification Search
  CPC  E01H 5/02; E04D 13/106; B25G 1/04; B60S 3/045; A01B 1/02; A01B 1/022
  USPC ............................. 294/54.5, 57; 37/284, 285
  See application file for complete search history.

(56) References Cited

U.S. PATENT DOCUMENTS

| | | | | |
|---|---|---|---|---|
| 3,091,790 A | * | 6/1963 | Schroeder | E04D 13/106 |
| | | | | 15/105 |
| 4,166,330 A | * | 9/1979 | Flick | E01H 5/02 |
| | | | | 294/56 |
| 4,321,724 A | | 3/1982 | Samuels | |
| 4,550,943 A | | 11/1985 | Mirto | |
| 4,878,704 A | * | 11/1989 | Jacanin, Jr. | E01H 5/02 |
| | | | | 294/51 |
| 5,048,883 A | * | 9/1991 | Waluk | E01H 5/02 |
| | | | | 294/54.5 |
| 5,067,197 A | | 11/1991 | Cormier | |
| 5,908,255 A | | 6/1999 | Branch | |
| 5,956,873 A | | 9/1999 | Hess | |
| D475,257 S | | 6/2003 | Somers | |
| 6,578,890 B1 | * | 6/2003 | Gilmore | E04D 13/106 |
| | | | | 294/53.5 |
| 8,347,528 B1 | * | 1/2013 | Seltzer | E01H 5/02 |
| | | | | 172/371 |
| 8,800,175 B1 | * | 8/2014 | Faraci | E01H 5/02 |
| | | | | 294/54.5 |
| 2008/0086919 A1 | | 4/2008 | Chartier, Jr. | |
| 2011/0258889 A1 | | 10/2011 | Settembre et al. | |

* cited by examiner

*Primary Examiner* — Dean Kramer

(57) ABSTRACT

An overhead snow moving device for moving snow positioned overhead includes a plurality of rods. Each rod has a first end and a second end, and comprises a plurality of nested sections. Supports are coupled to and extend between the rods proximate to top ends of the nested sections. A strut is coupled to and extends between the rods proximate to the first ends of the rods. First couplers are positioned proximate to the top ends of the nested sections. Second couplers, complimentary to the first couplers, are positioned proximate to bottom ends of the nested sections. Each of a plurality of extenders is angularly coupled to and extends from a respective second end of a rod. A plow is coupled to each of the extenders distally from the second ends of the rods.

18 Claims, 5 Drawing Sheets

OVERHEAD SNOW MOVING DEVICE

BACKGROUND OF THE DISCLOSURE

Field of the Disclosure

The disclosure relates to snow moving devices and more particularly pertains to a new snow moving device for moving snow positioned overhead.

SUMMARY OF THE DISCLOSURE

An embodiment of the disclosure meets the needs presented above by generally comprising a plurality of rods. Each rod has a first end and a second end, and comprises a plurality of nested sections. Supports are coupled to and extend between the rods proximate to top ends of the nested sections. A strut is coupled to and extends between the rods proximate to the first ends of the rods. First couplers are positioned proximate to the top ends of the nested sections. Second couplers, complimentary to the first couplers, are positioned proximate to bottom ends of the nested sections. Each of a plurality of extenders is angularly coupled to and extends from a respective second end of a rod. A plow is coupled to each of the extenders distally from the second ends of the rods.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
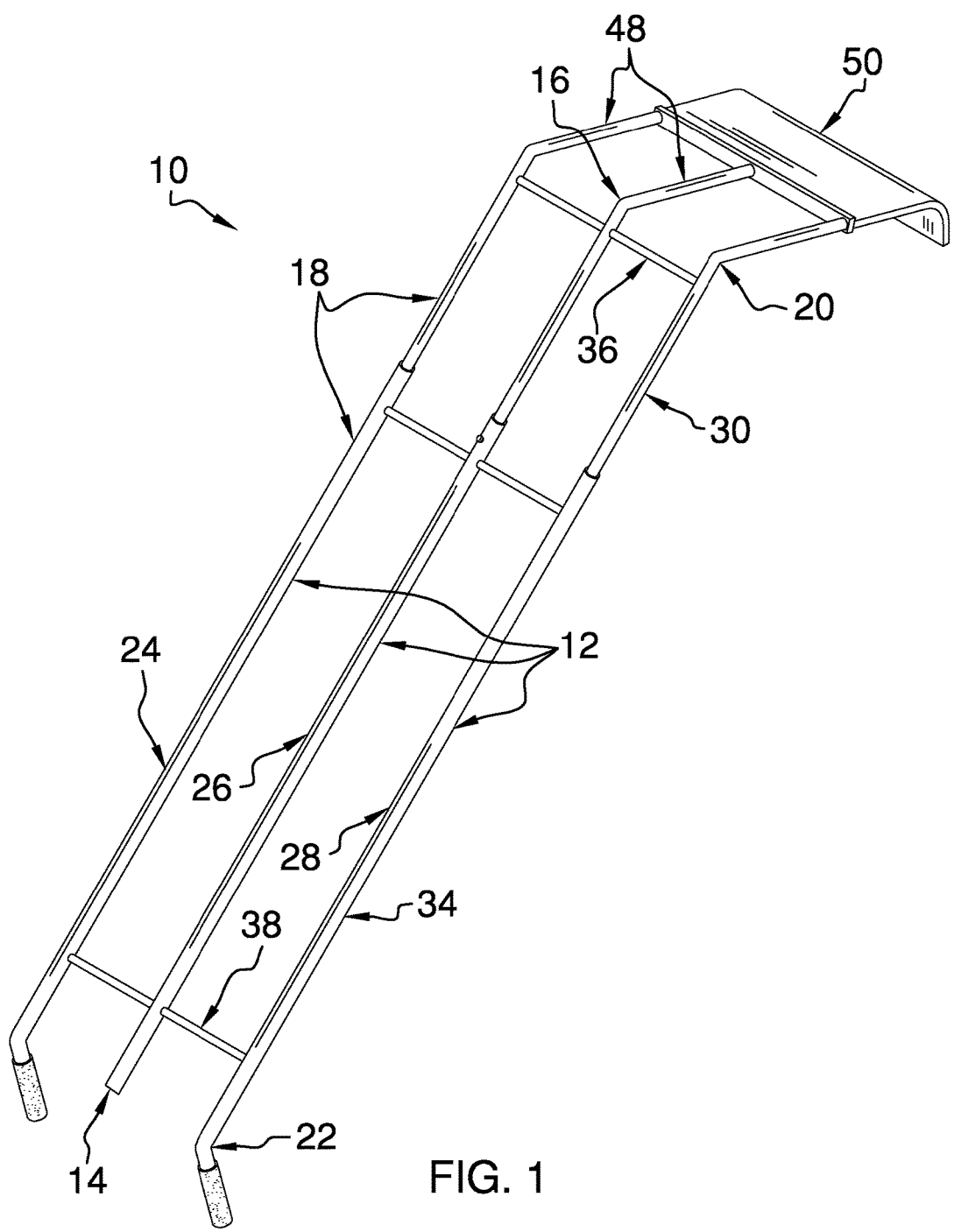
FIG. 1 is an isometric perspective view of an overhead snow moving device according to an embodiment of the disclosure.
Figure 2:
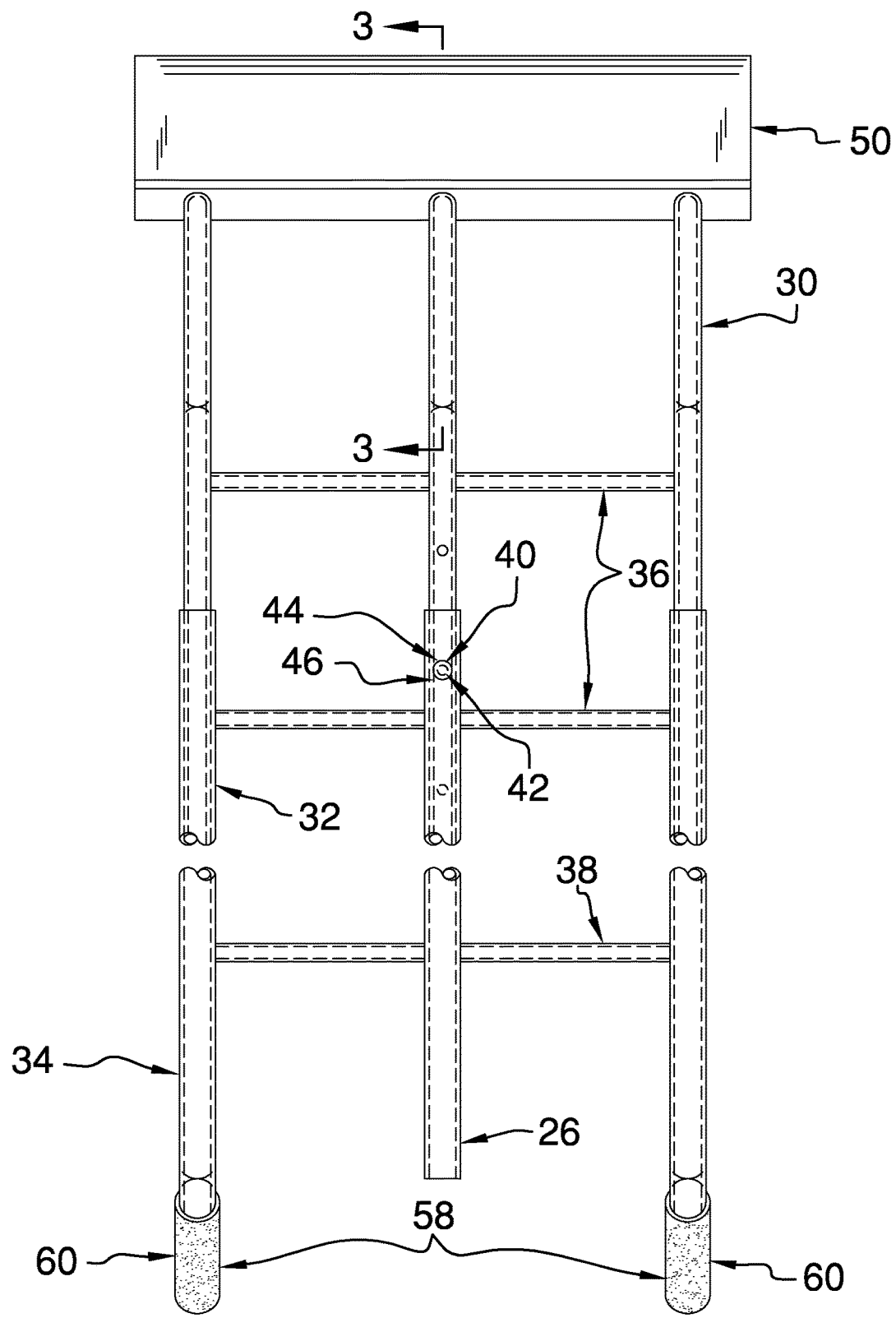
FIG. 2 is a front view of an embodiment of the disclosure.
Figure 3:
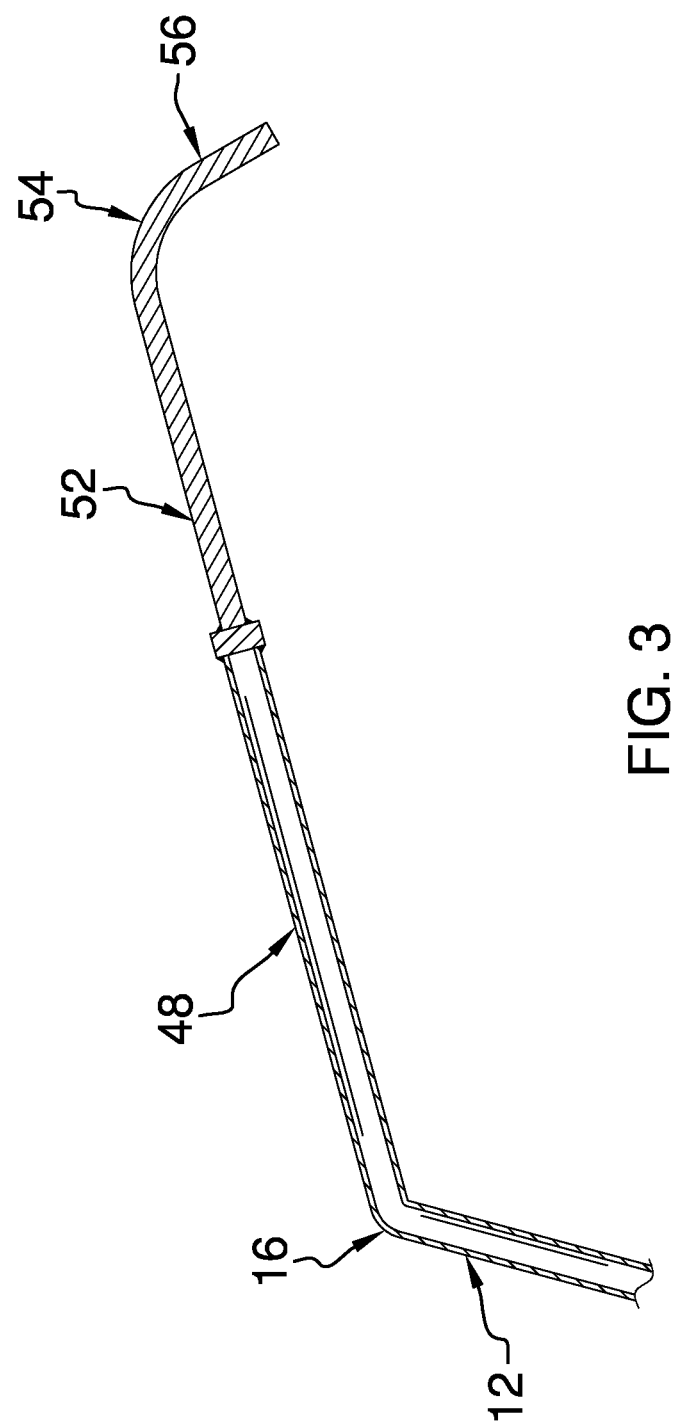
FIG. 3 is a side view of an embodiment of the disclosure.
Figure 4:
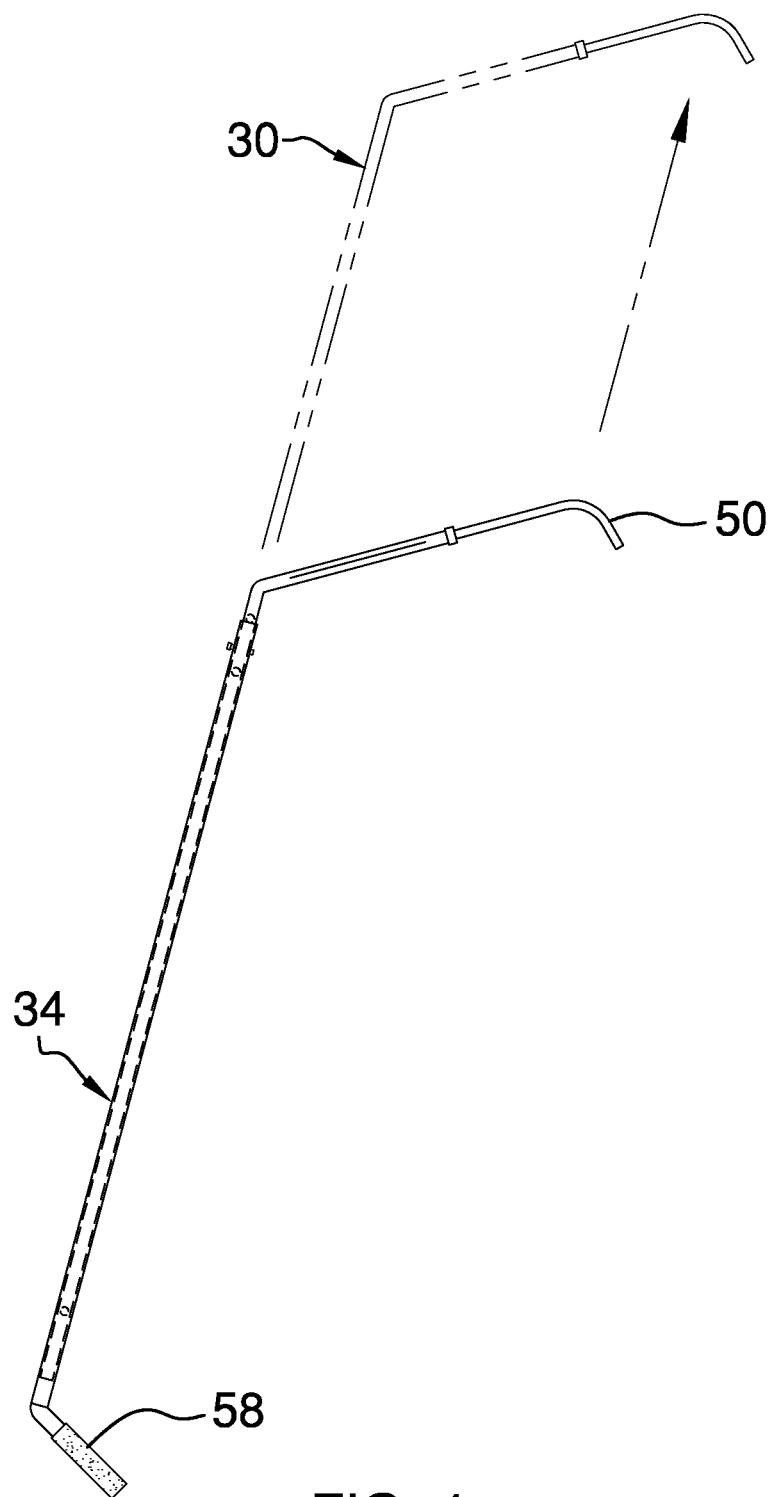
FIG. 4 is a cross-sectional view of an embodiment of the disclosure.
Figure 5:
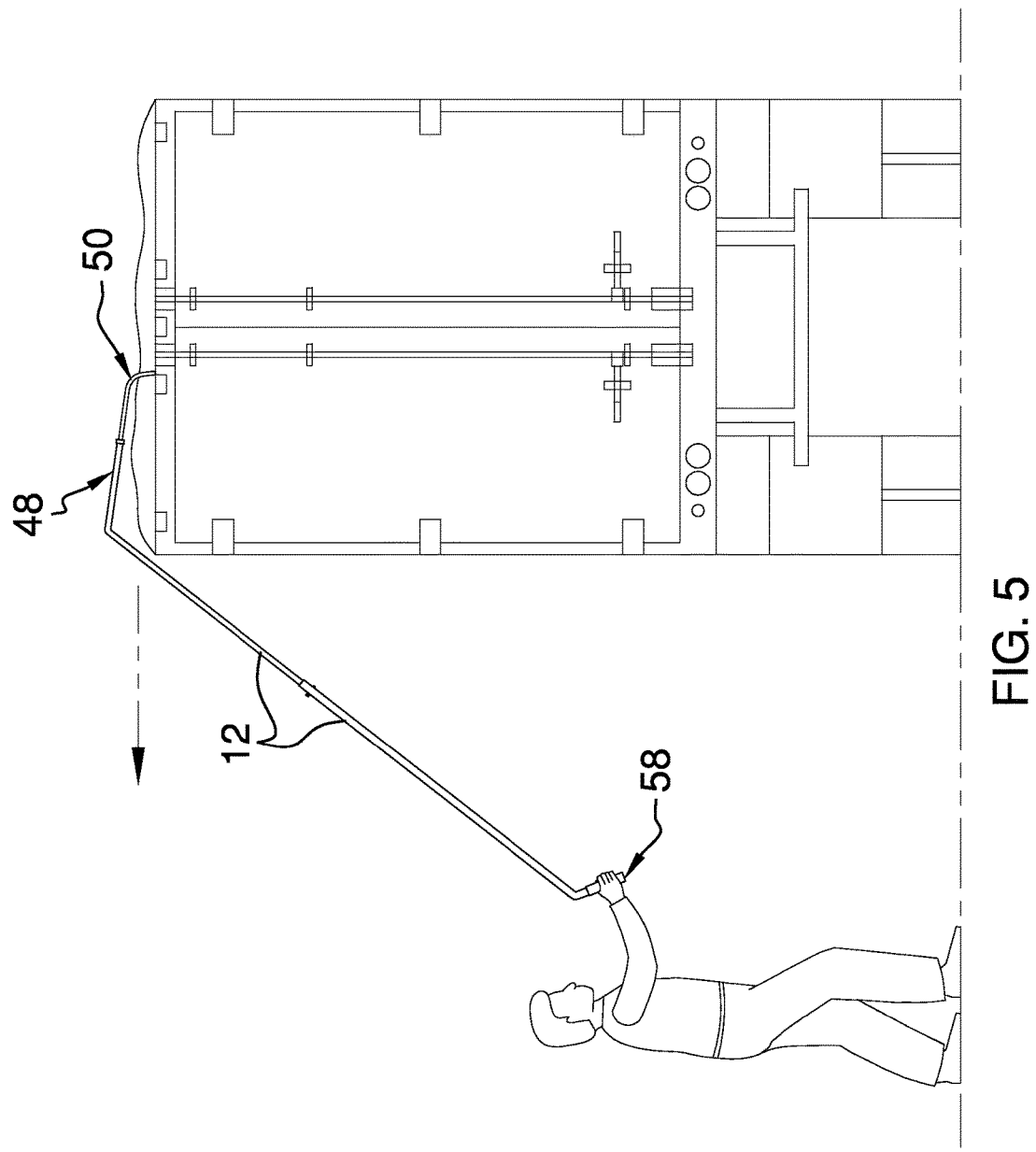
FIG. 5 is an in-use view of an embodiment of the disclosure.

With reference now to the drawings, and in particular to FIGS. 1 through 5 thereof, a new snow moving device embodying the principles and concepts of an embodiment of the disclosure and generally designated by the reference numeral 10 will be described.

As best illustrated in FIGS. 1 through 5, the overhead snow moving device 10 generally comprises a plurality of rods 12 that each has a first end 14 and a second end 16. Each rod 12 comprises a plurality of nested sections 18, such that the rod 12 is telescopic. Each nested section 18 has a top end 20 and a bottom end 22. The rods 12 are circular when viewed longitudinally. Preferably, the plurality of rods 12 comprises a left rod 24, a center rod 26, and a right rod 28. Each of the plurality of nested sections 18 comprises an innermost section 30, a plurality of medial sections 32, and an outermost section 34. The innermost section 30 comprises the second end 16 of the rod, and the outermost section 34 comprises the first end 14 of the rod. Preferably, each of the plurality of nested sections 18 comprises two sections 18.

Each of a plurality of supports 36 is coupled to and extends between each of the plurality of rods 12 proximate to respective top ends 20 of the nested sections 18. The plurality of rods 12 is substantially parallel and coplanar. The plurality of supports 36 is substantially parallel. The rods 12 are substantially evenly spaced. Preferably, the plurality of supports 36 is circular when viewed longitudinally and comprises two supports 36.

A strut 38 is coupled to and extends between each of the plurality of rods 12 proximate to respective first ends 14. The strut 38 is substantially parallel with the plurality of supports 36. Preferably, the strut 38 is circular when viewed longitudinally.

Each of a plurality of first couplers 40 is positioned proximate to the top end 20 of a respective nested section 18. The first couplers 40 comprise holes 42. Preferably, the plurality of first couplers 40 is positioned in the medial sections 32 and the outermost section 34 of the center rod 26. More preferably, the plurality of first couplers 40 comprises one first coupler 40 positioned in the outermost section 34 of the center rod 26. Each of a plurality of second couplers 44 is complimentary to the first couplers 40 and is positioned proximate to the bottom end 22 of a respective nested section 18. Each of the first couplers 40 is positioned to reversibly couple to a respective second coupler 44 to secure a respective rod 12 in an extended position. The second couplers 44 comprise spring loaded locking pins 46. Preferably, the plurality of second couplers 44 is positioned in the medial sections 32 and the innermost section 30 of the center rod 26. More preferably, the plurality of second couplers 44 comprises one second coupler 44 positioned in the innermost section 30 of the center rod 26.

Each of a plurality of extenders 48 is angularly coupled to and extends from a respective second end 16 of a respective rod 12. Each extender 48 is coupled to a respective rod 12 such that the extender 48 and the respective rod 12 are angled between 90 and 160 degrees. Preferably, each extender 48 is coupled to the respective rod 12 such that the extender 48 and the respective rod 12 are angled between 100 and 145 degrees. The extenders 48 are circular when viewed longitudinally. The plurality of extenders 48 comprises three extenders 48.

A plow 50 is coupled to each of the extenders 48 distally from the second ends 16 of the rods 12. The plow 50 comprises a first plate 52 coupled to and extending from each of the extenders 48. The first plate 50 and the extenders 48 are substantially coplanar. A curved plate 54 is coupled longitudinally to the first plate 50 distally from the second ends 16 of the rods 12. An edge plate 56 is coupled longitudinally to the curved plate 54, also distally from the second ends 16 of the rods 12.

Each of a pair of handles 58 is coupled to a respective first end 14 of a respective rod 12, such that the handles 58 are positioned for grasping by the user. Each handle 58 extends from a respective rod 12 such that the handle 58 and the respective rod 12 are angled between 90 and 170 degrees.

Preferably, each handle 58 is coupled to a respective rod 12 such that the handle 58 and the respective rod 12 are angled between 120 and 140 degrees. The handles 58 are circular when viewed longitudinally. Preferably, the pair of handles 58 is coupled singularly to the left rod 24 and the right rod 28. Each of a pair of grips 60 is coupled to a respective handle 58 to facilitate grasping by the user.

In use, the plurality of nested sections 18 is securable in an extended position by reversible coupling of the first couplers 40 and the second couplers 44. The user can now use the plow 50 to access overhead locations requiring snow or ice removal. The extenders 48 and the rods 12 allow the edge plate 56 to be positioned into the snow on a surface normally out of reach. The user then can use the handles 58 to withdraw the plow 50 laterally, moving the snow off the surface. Potential applications of the device 10 include its use in removal of snow and ice from the tops of trailers, buses, trucks, vans and RVs.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An overhead snow moving device comprising:
    a plurality of rods, each said rod having a first end and a second end, each said rod comprising a plurality of nested sections, wherein said rod is telescopic, each said nested section having a top end and a bottom end said plurality of rods comprising a left rod, a center rod, and a right rod;
    a plurality of supports, each said support being coupled to and extending between each of said plurality of rods proximate to respective said top ends of said nested sections, such that said plurality of rods are substantially parallel and coplanar and such that said plurality of supports are substantially parallel;
    a strut, said strut being coupled to and extending between each of said plurality of rods proximate to respective said first ends, such that said strut is substantially parallel with said plurality of supports;
    a plurality of first couplers, each said first coupler being positioned proximate to a top end of a respective said nested section;
    a plurality of second couplers, said second couplers being complimentary to said first couplers, each said second coupler being positioned proximate to a bottom end of a respective said nested section, such that each of said first couplers are positioned to reversibly couple to a respective said second coupler to secure a respective said rod in an extended position;
    a plurality of extenders, each said extender being angularly coupled to and extending from a respective said second end of a respective said rod;
    a plow, said plow being coupled to each of said extenders distally from said second ends of said rods; and
    wherein said plurality of nested sections is securable in an extended position by reversible coupling of said first couplers and said second couplers such that said plow is configured to access overhead locations requiring snow or ice removal.

2. The device of claim 1, further comprising:
    each of said plurality of nested sections comprising two sections; and
    said plurality of supports comprising two supports.

3. The device of claim 1, further including said rods being substantially evenly spaced.

4. The device of claim 1, further comprising:
    said first couplers comprising holes; and
    and said second couplers comprising spring loaded locking pins.

5. The device of claim 1, further including each said extender being coupled to said respective said rod such that said extender and said respective said rod are angled between 90 and 160 degrees.

6. The device of claim 5, further including each said extender being coupled to said respective said rod such that said extender and said respective said rod are angled between 100 and 145 degrees.

7. The device of claim 1, further including a pair of handles, each said handle being coupled to respective first end of a respective said rod, each said handle extending from said respective said rod such that said handle and said respective said rod are angled between 90 and 170 degrees, such that said handles are positioned for grasping by the user.

8. The device of claim 7, further including each said handle being coupled to said respective said rod such that said handle and said respective said rod are angled between 120 and 140 degrees.

9. The device of claim 7, further including said rods, said supports, said strut, said extenders and said handles being circular when viewed longitudinally.

10. The device of claim 7, further including a pair of grips, each said grip being coupled to a respective said handle.

11. An overhead snow moving device comprising:
    a plurality of rods, each said rod having a first end and a second end, each said rod comprising a plurality of nested sections, wherein said rod is telescopic, each said nested section having a top end and a bottom end;
    a plurality of supports, each said support being coupled to and extending between each of said plurality of rods proximate to respective said top ends of said nested sections, such that said plurality of rods are substantially parallel and coplanar and such that said plurality of supports are substantially parallel;
    a strut, said strut being coupled to and extending between each of said plurality of rods proximate to respective said first ends, such that said strut is substantially parallel with said plurality of supports;
    a plurality of first couplers, each said first coupler being positioned proximate to a top end of a respective said nested section;
    a plurality of second couplers, said second couplers being complimentary to said first couplers, each said second coupler being positioned proximate to a bottom end of a respective said nested section, such that each of said first couplers are positioned to reversibly couple to a respective said second coupler to secure a respective said rod in an extended position;

a plurality of extenders, each said extender being angularly coupled to and extending from a respective said second end of a respective said rod;

a plow, said plow being coupled to each of said extenders distally from said second ends of said rods;

wherein said plurality of nested sections is securable in an extended position by reversible coupling of said first couplers and said second couplers such that said plow is configured to access overhead locations requiring snow or ice removal; and each of said plurality of nested sections comprising:
an innermost section, said innermost section comprising said second end of said rod;
a medial section; and
an outermost section, said outermost section comprising said first end of said rod.

12. The device of claim 11, further comprising:
said plurality of first couplers being positioned in said medial section and said outermost section; and
said plurality of second couplers being positioned in said medial section and said innermost section.

13. The device of claim 12, further comprising:
said plurality of first couplers being positioned in said center rod; and
said plurality of second couplers being positioned in said center rod.

14. The device of claim 13, further comprising:
said plurality of first couplers comprising one first coupler positioned in said outermost section of said center rod; and
said plurality of second couplers comprising one second coupler positioned in said innermost section of said center rod.

15. An overhead snow moving device comprising:
a plurality of rods, each said rod having a first end and a second end, each said rod comprising a plurality of nested sections, wherein said rod is telescopic, each said nested section having a top end and a bottom end;
a plurality of supports, each said support being coupled to and extending between each of said plurality of rods proximate to respective said top ends of said nested sections, such that said plurality of rods are substantially parallel and coplanar and such that said plurality of supports are substantially parallel;
a strut, said strut being coupled to and extending between each of said plurality of rods proximate to respective said first ends, such that said strut is substantially parallel with said plurality of supports;
a plurality of first couplers, each said first coupler being positioned proximate to a top end of a respective said nested section;
a plurality of second couplers, said second couplers being complimentary to said first couplers, each said second coupler being positioned proximate to a bottom end of a respective said nested section, such that each of said first couplers are positioned to reversibly couple to a respective said second coupler to secure a respective said rod in an extended position;
a plurality of extenders, each said extender being angularly coupled to and extending from a respective said second end of a respective said rod;
a plow, said plow being coupled to each of said extenders distally from said second ends of said rods;
wherein said plurality of nested sections is securable in an extended position by reversible coupling of said first couplers and said second couplers such that said plow is configured to access overhead locations requiring snow or ice removal; and
said plurality of extenders comprising three extenders.

16. An overhead snow moving device comprising:
a plurality of rods, each said rod having a first end and a second end, each said rod comprising a plurality of nested sections, wherein said rod is telescopic, each said nested section having a top end and a bottom end;
a plurality of supports, each said support being coupled to and extending between each of said plurality of rods proximate to respective said top ends of said nested sections, such that said plurality of rods are substantially parallel and coplanar and such that said plurality of supports are substantially parallel;
a strut, said strut being coupled to and extending between each of said plurality of rods proximate to respective said first ends, such that said strut is substantially parallel with said plurality of supports;
a plurality of first couplers, each said first coupler being positioned proximate to a top end of a respective said nested section;
a plurality of second couplers, said second couplers being complimentary to said first couplers, each said second coupler being positioned proximate to a bottom end of a respective said nested section, such that each of said first couplers are positioned to reversibly couple to a respective said second coupler to secure a respective said rod in an extended position;
a plurality of extenders, each said extender being angularly coupled to and extending from a respective said second end of a respective said rod;
a plow, said plow being coupled to each of said extenders distally from said second ends of said rods;
wherein said plurality of nested sections is securable in an extended position by reversible coupling of said first couplers and said second couplers such that said plow is configured to access overhead locations requiring snow or ice removal; and
said plow comprising:
a first plate, said first plate being coupled to and extending from each of said extenders, said first plate and said extender being substantially coplanar;
a curved plate coupled longitudinally to said first plate distally from said second ends; and
an edge plate coupled longitudinally to said curved plate distally from said second ends.

17. An overhead snow moving device comprising:
a plurality of rods, each said rod having a first end and a second end, each said rod comprising a plurality of nested sections, wherein said rod is telescopic, each said nested section having a top end and a bottom end;
a plurality of supports, each said support being coupled to and extending between each of said plurality of rods proximate to respective said top ends of said nested sections, such that said plurality of rods are substantially parallel and coplanar and such that said plurality of supports are substantially parallel;
a strut, said strut being coupled to and extending between each of said plurality of rods proximate to respective said first ends, such that said strut is substantially parallel with said plurality of supports;
a plurality of first couplers, each said first coupler being positioned proximate to a top end of a respective said nested section;

a plurality of second couplers, said second couplers being complimentary to said first couplers, each said second coupler being positioned proximate to a bottom end of a respective said nested section, such that each of said first couplers are positioned to reversibly couple to a respective said second coupler to secure a respective said rod in an extended position;

a plurality of extenders, each said extender being angularly coupled to and extending from a respective said second end of a respective said rod;

a plow, said plow being coupled to each of said extenders distally from said second ends of said rods;

wherein said plurality of nested sections is securable in an extended position by reversible coupling of said first couplers and said second couplers such that said plow is configured to access overhead locations requiring snow or ice removal;

a pair of handles, each said handle being coupled to respective first end of a respective said rod, each said handle extending from said respective said rod such that said handle and said respective said rod are angled between 90 and 170 degrees, such that said handles are positioned for grasping by the user; and said pair of handles being coupled singularly to a left rod and a right rod.

18. An overhead snow moving device comprising:

a plurality of rods, each said rod having a first end and a second end, each said rod comprising a plurality of nested sections, wherein said rod is telescopic, each said nested section having a top end and a bottom end, said rods being circular when viewed longitudinally, said plurality of rods comprising a left rod, a center rod, and a right rod;

each of said plurality of nested sections comprising:
   an innermost section, said innermost section comprising said second end of said rod,
   a medial section, and
   an outermost section, said outermost section comprising said first end of said rod;

a plurality of supports, each said support being coupled to and extending between each of said plurality of rods proximate to respective said top ends of said nested sections, such that said plurality of rods are substantially parallel and coplanar and such that said plurality of supports are substantially parallel, said rods being substantially evenly spaced, said supports being circular when viewed longitudinally, said plurality of supports comprising two supports;

a strut, said strut being coupled to and extending between each of said plurality of rods proximate to respective said first ends, such that said strut is substantially parallel with said plurality of supports; said strut being circular when viewed longitudinally;

a plurality of first couplers, each said first coupler being positioned proximate to a top end of a respective said nested section, said first couplers comprising holes, said plurality of first couplers being positioned in said medial sections and said outermost section, said plurality of first couplers being positioned in said center rod, said plurality of first couplers comprising one first coupler positioned in said outermost section of said center rod;

a plurality of second couplers, said second couplers being complimentary to said first couplers, each said second coupler being positioned proximate to a bottom end of a respective said nested section, such that each of said first couplers are positioned to reversibly couple to a respective said second coupler to secure a respective said rod in an extended position, said second couplers comprising spring loaded locking pins, said plurality of second couplers being positioned in said medial sections and said innermost section, said plurality of second couplers being positioned in said center rod, said plurality of second couplers comprising one second coupler positioned in said innermost section of said center rod;

a plurality of extenders, each said extender being angularly coupled to and extending from a respective said second end of a respective said rod, each said extender being coupled to said respective said rod such that said extender and said respective said rod are angled between 90 and 160 degrees, said extenders being circular when viewed longitudinally, said plurality of extenders comprising three extenders;

a plow, said plow being coupled to each of said extenders distally from said second ends of said rods, said plow comprising:
   a first plate, said first plate being coupled to and extending from each of said extenders, said first plate and said extender being substantially coplanar,
   a curved plate coupled longitudinally to said first plate distally from said second ends, and
   an edge plate coupled longitudinally to said curved plate distally from said second ends;

a pair of handles, each said handle being coupled to respective first end of a respective said rod, such that said handles are positioned for grasping by the user, each said handle extending from said respective said rod such that said handle and said respective said rod are angled between 90 and 170 degrees, said handles being circular when viewed longitudinally, said pair of handles being coupled singularly to said left rod and said right rod;

a pair of grips, each said grip being coupled to a respective said handle; and wherein said plurality of nested sections is securable in an extended position by reversible coupling of said first couplers and said second couplers such that said plow is configured to access overhead locations requiring snow or ice removal.

* * * * *